(12) United States Patent
Yang et al.

(10) Patent No.: US 11,569,896 B2
(45) Date of Patent: Jan. 31, 2023

(54) BEAM FAILURE RECOVERY OR A RADIO LINK MONITORING PROCESSING METHOD, USER EQUIPMENT, AND NETWORK-SIDE DEVICE

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 157 days.

(21) Appl. No.: 17/094,681

(22) Filed: Nov. 10, 2020

(65) Prior Publication Data

US 2021/0058136 A1     Feb. 25, 2021

Related U.S. Application Data

(63) Continuation of application No. PCT/CN2019/085982, filed on May 8, 2019.

(30) Foreign Application Priority Data

May 10, 2018    (CN) .......................... 201810445105.6

(51) Int. Cl.
*H04B 7/08*     (2006.01)
*H04W 16/28*    (2009.01)
(Continued)

(52) U.S. Cl.
CPC ............ *H04B 7/088* (2013.01); *H04W 16/28* (2013.01); *H04W 24/08* (2013.01); *H04W 72/042* (2013.01); *H04W 72/0453* (2013.01)

(58) Field of Classification Search
CPC ...... H04B 7/088; H04B 7/0695; H04B 7/061; H04B 17/309; H04W 16/28; H04W 24/08;
(Continued)

(56) References Cited

U.S. PATENT DOCUMENTS

| | | |
|---|---|---|
| 2014/0043988 A1 | 2/2014 | Chen et al. |
| 2014/0177531 A1 | 6/2014 | Imamura et al. |

(Continued)

FOREIGN PATENT DOCUMENTS

| | | |
|---|---|---|
| CN | 103718594 A | 4/2014 |
| CN | 104509018 A | 4/2015 |

(Continued)

OTHER PUBLICATIONS

EP Search Report in Application No. 19798914.8 dated May 31, 2021.

(Continued)

*Primary Examiner* — Kiet Tang
(74) *Attorney, Agent, or Firm* — Maschoff Brennan (57) ABSTRACT

A processing method, user equipment, and a network-side device are provided. The method includes: when there is no explicitly configured beam failure detection reference signal or radio link monitoring reference signal, and there is a first reference signal on a first bandwidth part, determining a determination criterion for beam failure detection actions or radio link monitoring actions of UE; and determining a beam failure detection action or a radio link monitoring action of the UE based on the determination criterion; where, the first reference signal is a reference signal whose QCL type is a specified type in a reference signal set, the reference signal set is indicated by a transmission configuration indication state of a physical downlink control chan- (Continued)

nel on a control resource set on a second bandwidth part, and the second bandwidth part is in an active state.

12 Claims, 6 Drawing Sheets

(51) Int. Cl.
*H04W 24/08* (2009.01)
*H04W 72/04* (2009.01)

(58) Field of Classification Search
CPC .......... H04W 72/042; H04W 72/0453; H04W 24/02; H04L 5/0005; H04L 5/0048; H04L 5/0053
See application file for complete search history.

(56) References Cited

U.S. PATENT DOCUMENTS

| | | | |
|---|---|---|---|
| 2016/0192376 A1 | 6/2016 | Lee et al. | |
| 2016/0278103 A1 | 9/2016 | Kazmi et al. | |
| 2018/0115940 A1 | 4/2018 | Abedini et al. | |
| 2019/0173740 A1* | 6/2019 | Zhang | H04L 41/0668 |
| 2019/0208507 A1* | 7/2019 | Xiong | H04L 1/0061 |
| 2019/0320469 A1* | 10/2019 | Huang | H04B 7/0456 |
| 2020/0059397 A1* | 2/2020 | da Silva | H04B 7/0695 |

FOREIGN PATENT DOCUMENTS

| | | |
|---|---|---|
| CN | 105659687 A | 6/2016 |
| CN | 105934973 A | 9/2016 |
| WO | 2013/141544 A1 | 9/2013 |

OTHER PUBLICATIONS

"Beam recovery procedures" Qualcomm Incorporated, 3GPP TSG RAN WG1 Meeting #92, R1-1802824, Feb. 26, 2018.
JP Office Action in Application No. 2020-563449 dated Jan. 4, 2022.
"Remaining issues for radio link monitoring" Ericsson, 3GPP TSG RAN WG1 Meeting #92bis, R1-1805223, Apr. 16, 2018.
CN Office Action in Application No. 201810445105.6 dated Apr. 15, 2020.
"Remaining issues on mechanism to recover from beam failure" vivo, 3GPP TSG RAN WG1 Meeting #92bis, R1-1803818, Apr. 16, 2018.
"Summary 3 on Remaining issues on Beam Failure Recovery" MediaTek Inc., 3GPP TSG RAN WG1 Meeting #92bis, R1-1805730, Apr. 16, 2018.
Written Opinion and International Search Report in Application No. PCT/CN2019/085982 dated Nov. 19, 2020.

* cited by examiner

BEAM FAILURE RECOVERY OR A RADIO LINK MONITORING PROCESSING METHOD, USER EQUIPMENT, AND NETWORK-SIDE DEVICE

CROSS-REFERENCE TO RELATED APPLICATIONS

This application is continuation application of PCT International Application No. PCT/CN2019/085982 filed on May 8, 2019, which claims priority to Chinese Patent Application No. 201810445105.6 filed in China on May 10, 2018, the disclosures of which are incorporated in their entireties by reference herein.

TECHNICAL FIELD

Some embodiments of the disclosure relate to the field of communications technologies, and specifically, to a processing method, user equipment, and a network-side device.

BACKGROUND

With the development of mobile communication technologies, more and more technologies to improve communication efficiency are introduced. For example:

1. Beam Failure Recovery (Beam Failure Recovery, BFR) Mechanism

In high-frequency band communication systems, because the wavelength of a wireless signal is relatively short, it is more likely, for example, that signal propagation is blocked, resulting in interruption of the signal propagation. In the case that the radio link reconstruction in the related art is adopted, it takes a long time, so a beam failure recovery mechanism is introduced. The mechanism includes the following four parts:

(1) Beam failure detection (Beam Failure Detection, BFD). User equipment (User Equipment, UE) measures a BFD reference signal (Reference Signal, RS) at the physical layer, and determines whether a beam failure event has occurred based on the measurement result. The BFD RS may be a periodical channel state information-reference signal (Channel State Information-RS, CSI-RS) or a synchronization signal block (Synchronization Signal Block, SSB). The determination criterion is: if it is detected that metrics (metric) of all serving beams (serving beam) meet a preset condition (exceeding a preset threshold), a beam failure instance (beam failure instance) is determined; and the UE physical layer reports an indication to a UE higher layer (media access control (Media Access Control, MAC) layer), where the reporting process is periodic. On the contrary, if the UE physical layer determines that no beam failure instance has occurred, it sends no indication to the higher layer. The UE higher layer uses a counter (counter) to count the indications reported by the physical layer, and the UE declares occurrence of a beam failure event when the network-configured maximum number is reached.

(2) New candidate beam identification (New candidate beam identification). The UE physical layer measures candidate beam RSs (candidate beam RS) to find a new candidate beam (candidate beam). This step is not enforced to be performed after a beam failure event occurs, but it may be performed before a beam failure event. When the UE physical layer receives a request or an indication or a notification from the UE higher layer (MAC layer), the UE physical layer reports to the UE higher layer the measurement results that meet a preset condition (the quality measured on a candidate beam RS exceeds a preset threshold of L1—Reference signal received power (Reference Signal Received Power, RSRP)). The reported content is {beam RS index, L1—RSRP}. The UE higher layer selects a candidate beam based on the report of the physical layer.

(3) Beam failure recovery request transmission (Beam failure recovery request transmission). The UE higher layer determines a physical random access channel (Physical Random Access Channel, PRACH) resource (resource) or sequence (sequence) based on the selected candidate beam. If the UE determines that a trigger condition of a beam failure recovery request is met, the UE sends the above request to a base station on a non-contention based PRACH. The UE is required to send the request according to a network-configured number of request sending times and/or timer (timer). Here the non-contention PRACH resource and other PRACH resources (such as a PRACH resource for initial access) may be frequency division multiplexing (Frequency Division Multiplexing, FDM) or code division multiplexing (Code Division Multiplexing, CDM) resources, where CDM-based PRACH preambles (preambles) are required to have a same sequence design.

(4) The UE monitors base station response for the beam failure recovery request (UE monitors gNB response for beam failure recovery request). The base station sends a response in a dedicated (dedicated) physical downlink control channel (Physical Downlink Control Channel, PDCCH) on a control resource set (Control-Resource SET, CORESET)-BFR after receiving the request. The response carries a cell radio network temporary identifier (Cell Radio Network Temporary Identifier, C-RNTI), and also possibly includes an instruction to switch to a new candidate beam or restart beam search or other instructions. If the beam failure recovery is unsuccessful, the UE physical layer sends an indication to the UE higher layer for the higher layer to determine a subsequent radio link failure process.

In the course of beam failure detection, the network configures periodic CSI-RS resources or SSB resources as BFD RSs. These BFD RSs are in quasi-co-location (Quasi-Co-Location, QCL) with the CORESET of an active bandwidth part (active BWP). When no BFD RS is configured by the network, an RS whose QCL type is type D (type D) (for indicating a spatial receiving parameter) in an RS set (set) indicated by a transmission configuration indication (Transmission Configuration Indication, TCI) state of the PDCCH configured and indicated on the active BWP is used as a BFD RS.

2. Radio Link Monitoring (Radio Link Monitoring, RLM) Mechanism

Due to the factors such as interference and fading, links between the network side and the UE may stop working for a long time, and at this time a radio link failure process is initiated.

The network side configures the UE with N radio link monitoring reference signals (Radio link monitoring reference signal, RLM-RS) for radio link monitoring and evaluating the radio link quality. The radio link quality is determined by assumed PDCCH block error rates (Block Error Rate, BLER).

Among the assumed PDCCH-BLERs calculated based on the N RLM-RSs, if the assumed PDCCH-BLER corresponding to at least one RLM-RS is above a threshold value Q_in, an in-sync (In-sync, IS) is reported.

Among the assumed PDCCH-BLERs calculated based on the N RLM-RSs, if the assumed PDCCH-BLERs corresponding to all RLM-RSs are lower than a threshold value Q_out, then an out-of-sync (Out-of-sync, OOS) is reported.

The UE reports the IS or OOS to the higher layer. If a given number of OOSs is reported consecutively, a radio link failure is considered to have occurred. The higher layer needs to start a T310 counter, and considers that the radio link is able to work properly and stops the T310 counter if the number of ISs consecutively reported exceeds a threshold while the T310 counter is running; otherwise, the higher layer declares a radio link failure.

The UE obtains an estimation of the assumed PDCCH-BLER based on a signal to interference plus noise ratio (Signal to Interference plus Noise Ratio, SINR) metric.

In new radio (New Radio, NR) Release 15 (Release 15), for 0-3 GHz scenarios, the maximum value of N is 2; for 3-6 GHz scenarios, the maximum value of N is 4; for scenarios above 6 GHz, the maximum value of N is 8.

During the process of radio link monitoring, the network configures the periodic CSI-RS resources or SSB resources as RLM RSs. When no RLM RS is configured by the network, an RS whose quasi-co-location (Quasi-Co-Location, QCL) type is type D (type D) in an RS set indicated by a transmission configuration indication (Transmission Configuration Indication, TCI) state of the physical downlink control channel (Physical Downlink Control Channel, PDCCH) configured and indicated on the active bandwidth part (active BWP) is used as an RLM RS.

In the related technologies, in the case there is no BFD RS or RLM RS explicitly configured on the active BWP, when the RS whose QCL type is type D is on another BWP, that QCL type indicated by the TCI state of the PDCCH on the control resource set (Control-Resource SET, CORESET) on the active BWP, the UE may be unable to determine the beam failure detection or radio link monitoring action, resulting in ineffectiveness of communication.

SUMMARY

One objective of some embodiments of the present disclosure is to provide a processing method, user equipment, and a network-side device, to facilitate a beam failure detection action or a radio link monitoring action of UE in a beam failure recovery process or a radio link monitoring process.

In a first aspect, a processing method applied to UE is provided. The method includes:
when there is no explicitly configured beam failure detection reference signal or radio link monitoring reference signal, and there is a first reference signal on a first bandwidth part, determining a determination criterion for beam failure detection actions or radio link monitoring actions of the UE; and
determining a beam failure detection action or a radio link monitoring action of the UE based on the determination criterion; where
the first reference signal is a reference signal whose QCL type is a specified type in a reference signal set, the reference signal set is indicated by a transmission configuration indication state of a physical downlink control channel on a control resource set on a second bandwidth part, and the second bandwidth part is in an active state.

In a second aspect, a processing method applied to a network-side device is further provided. The method includes:

when there is no explicitly configured beam failure detection reference signal or radio link monitoring reference signal, configuring a first reference signal on a second bandwidth part, where the first reference signal is a reference signal whose QCL type is a specified type in a reference signal set, the reference signal set is indicated by a transmission configuration indication state of a physical downlink control channel on a control resource set on the second bandwidth part, and the second bandwidth part is in an active state; or
explicitly configuring a beam failure detection reference signal or a radio link monitoring reference signal on a third bandwidth part for performing beam failure detection or radio link monitoring, where the beam failure detection reference signal or the radio link monitoring reference signal is in spatial QCL with a physical downlink control channel on a control resource set on the third bandwidth part.

In a third aspect, UE is further provided, including:
a first determining module, configured to, when there is no explicitly configured beam failure detection reference signal or radio link monitoring reference signal, and there is a first reference signal on a first bandwidth part, determine a determination criterion for beam failure detection actions or radio link monitoring actions of the UE; and
a second determining module, configured to determine a beam failure detection action or a radio link monitoring action of the UE based on the determination criterion; where
the first reference signal is a reference signal whose QCL type is a specified type in a reference signal set, the reference signal set is indicated by a transmission configuration indication state of a physical downlink control channel on a control resource set on a second bandwidth part, and the second bandwidth part is in an active state.

In a fourth aspect, a network-side device is further provided, including:
a configuration module, configured to, when there is no explicitly configured beam failure detection reference signal or radio link monitoring reference signal, configure a first reference signal on a second bandwidth part, where the first reference signal is a reference signal whose QCL type is a specified type in a reference signal set, the reference signal set is indicated by a transmission configuration indication state of a physical downlink control channel on a control resource set on the second bandwidth part, and the second bandwidth part is in an active state; or explicitly configure a beam failure detection reference signal or a radio link monitoring reference signal on a third bandwidth part for performing beam failure detection or radio link monitoring, where the beam failure detection reference signal or the radio link monitoring reference signal is in spatial QCL with a physical downlink control channel on a control resource set on the third bandwidth part.

In a fifth aspect, user equipment is further provided, including: a processor, a memory, and a computer program that is stored in the memory and capable of running on the processor, where when the computer program is executed by the processor, the steps of the processing method according to the first aspect are implemented.

In a sixth aspect, a network-side device is further provided, including: a processor, a memory, and a computer program that is stored in the memory and capable of running on the processor, where when the computer program is executed by the processor, the steps of the processing method according to the second aspect are implemented.

In a seventh aspect, a computer-readable storage medium is further provided, where the computer-readable storage medium stores a program; and when the program is executed by a processor, the steps of the processing method according to the first aspect or the second aspect are implemented.

In the embodiments of this disclosure, in the case there is no BFD RS or RLM RS explicitly configured on an active bandwidth part, when an RS whose QCI type is type D indicated by a TCI state of a PDCCH on a CORESET on the active bandwidth part is on another BWP, a beam failure detection action or a radio link monitoring action of UE is determined, so that the UE can continue to properly implement the beam failure detection or the radio link monitoring and recovery mechanism, thereby improving effectiveness of communication.

BRIEF DESCRIPTION OF DRAWINGS

Those of ordinary skill in the art will be clear about other advantages and benefits by reading the detailed description of the optional embodiments below. The accompanying drawings are merely intended to illustrate the objectives of the optional embodiments and should not be interpreted as limiting this disclosure. Throughout the accompanying drawings, the same reference numerals represent the same components. In the drawings.

DESCRIPTION OF EMBODIMENTS

The following clearly and comprehensively describes the technical solutions in some embodiments of this disclosure with reference to the accompanying drawings of the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

Terms "include", "comprise" and any other variants thereof in the specification and claims of the application are intended to cover the non-exclusive inclusion. For example, a process, method, system, product, or device that includes a series of steps or units is not necessarily limited to those expressly listed steps or units, but may include other steps or units not expressly listed or inherent to such process, method, system, product, or device. Moreover, use of "and/or" in the specification and claims represents at least one of the connected objects. For example, A and/or B means three cases: A alone, B alone, or A and B together.

In the embodiments of this disclosure, the word such as "exemplary" or "for example" is used to represent giving an example, an instance, or an illustration. Any embodiment or design scheme described as "exemplary" or "for example" in some embodiments of this disclosure should not be construed as being more preferred or having more advantages than other embodiments or design schemes. Exactly, use of the word "exemplary" or "for example" or the like is intended to present a related concept in a specific manner.

To help better understand the technical solutions of some embodiments of this disclosure, the following technical points are introduced firstly:

1. Multi-Antenna

The radio access technology standards such as long term evolution (Long Term Evolution, LTE) or long term evolution advanced (LTE-Advanced, LTE-A) are built on the basis of multiple-input multiple-output (Multiple-Input Multiple-Out-put, MIMO) and orthogonal frequency division multiplexing (Orthogonal Frequency Division Multiplexing, OFDM) technologies. Here, the MIMO technology utilizes spatial freedom that can be achieved by a multi-antenna system to improve peak rates and system spectrum utilization.

The dimensions of MIMO technology continue to expand during the development of standardization. In LTE Rel-8 (Rel-8), up to 4 layers of MIMO transmission can be supported. In Rel-9 (Rel-9) enhanced multi-user (Multi-User, MU)

MIMO technology, transmission mode 8 (Transmission Mode 8, TM-8) MU-MIMO (Multi-User MIMO) transmission can support up to 4 downlink data layers. In Rel-10 (Rel-10), the transmission capability of single-user (Single-User, SU) MIMO is extended to a maximum of 8 data layers.

The industry is further promoting the MIMO technology to be three-dimensional and large-scale. The 3rd Generation Partnership Project (3rd Generation Partnership Project, 3GPP) has completed research projects on three dimension (Three Dimensions, 3D) channel modeling, and is conducting research and standardization on evolved full dimension (Evolved Full Dimension, eFD) MIMO and new radio (New Radio, NR) MIMO. It is foreseeable that in the future fifth-generation (Fifth-generation, 5G) mobile communication system, MIMO technology of a larger scale and more antenna ports will be introduced.

Massive multiple-input multiple-output (Massive MIMO) technology uses massive antenna arrays to greatly increase system bandwidth utilization and support a larger number of access users. Therefore, major research organizations all regard massive MIMO technology as one of the most promising physical layer technologies in the next generation of mobile communication systems.

In the massive MIMO technology, if an all-digital array is used, a maximum spatial resolution and optimal MU-MIMO performance may be achieved, but this structure requires a large number of analog-to-digital/digital-to-analog (AD/DA) conversion devices and a large number of complete radio frequency-baseband processing channels, such that equipment cost and baseband processing complexity will both be a huge burden.

In order to avoid the above implementation cost and equipment complexity, hybrid digital-analog beamforming technology emerges, which is to add a beamforming stage to the radio frequency signal near the front end of the antenna system based on the traditional digital domain beamforming. Analog shaping enables a relatively coarse match between the transmitted signal and the channel in a relatively simple manner. The number of dimensions of the equivalent channel formed after the analog shaping is smaller than the actual number of antennas, so the required AD/DA conversion devices, the number of digital channels, and the corresponding baseband processing complexity may all be greatly reduced. The residual interference of the analog shaped portion may be processed again in the digital domain to ensure the quality of MU-MIMO transmission. Compared with full digital shaping, hybrid digital-analog beamforming is a compromise between performance and complexity. It has a high practical prospect in systems with large bandwidth in high frequency bands or large numbers of antennas.

2. High Frequency Bands

In the research of the next generation of communication systems after the fourth-generation (Fourth-generation, 4G) communication technologies, the operating frequency bands supported by the system has been raised to above 6 GHz, up to about 100 GHz. The high frequency bands have richer idle frequency resources, which can provide greater throughput for data transmission. 3GPP has completed the modeling of high-frequency channels. The wavelength of high-frequency signals is short. Compared with the low bands, more antenna array elements can be arranged on panels of the same size, and beamforming technology is used to form beams with stronger directivity and narrower lobe. Therefore, combining massive antennas with high-frequency communications is also one of the future trends.

3. Beam Measurement and Beam Reporting (Beam Measurement and Beam Reporting)

Analog beamforming features transmission at full bandwidth, and array elements of each polarization direction on the panel of each high frequency antenna array can only transmit analog beams in a time division multiplexed manner. The shaping weights of analog beams are implemented by adjusting parameters of RF front-end devices such as a phase shifter.

In the academic and industrial circles, the training of analog beamforming vectors is usually performed by means of polling, that is, the array elements of each polarization direction of each antenna panel sequentially transmit training signals (that is, candidate shaping vectors) in a time division multiplexed manner at the appointed time. The UE performs measurement and feedbacks a beam report for the network side to adopt the shaping vector used by the training signal to implement analog beam transmission in the next transmission service. The content of the beam report typically includes the IDs of several optimal transmit beams and the received power of each transmit beam measured.

Figure 1:
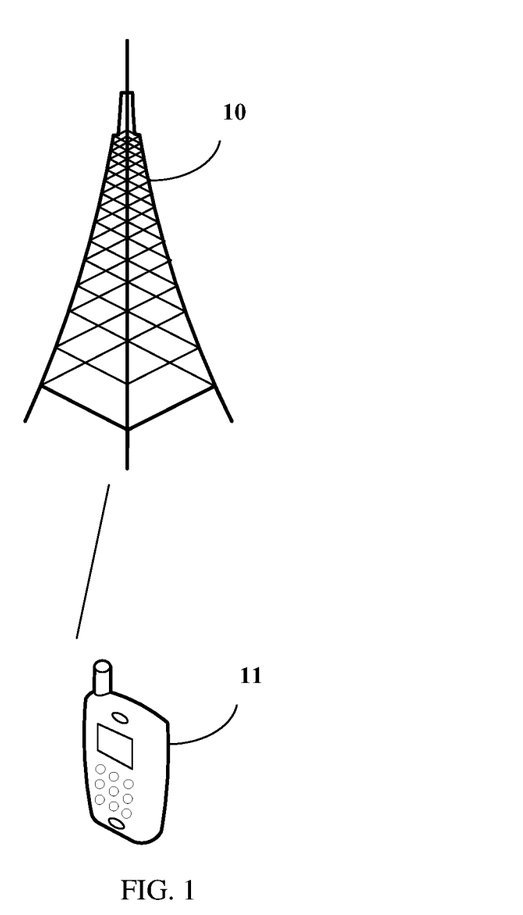
FIG. 1 is a schematic architectural diagram of a wireless communication system according to some embodiments of this disclosure.

The embodiments of this disclosure are introduced below with reference to the accompanying drawings. The processing method, the user equipment, and the network-side device provided in some embodiments of this disclosure may be applied into a wireless communication system. The wireless communication system may be a 5G system, or an evolved long term evolution (Evolved Long Term Evolution, eLTE) system, or a later evolved communication system. Referring to FIG. 1, it shows a schematic architectural diagram of a wireless communication system provided according to some embodiments of this disclosure. As shown in FIG. 1, the wireless communication system may include: a network-side device 10 and user equipment, for example, user equipment denoted as UE11. The UE11 may communicate with the network-side device 10. In practical applications, the connection between the above devices may be a wireless connection. For ease of visually representing the connection relationships between the devices, a solid line is used to indicate that in FIG. 1.

It is to be noted that the above communication system may include a plurality of UEs, and that the network-side device may communicate with a plurality of UEs (transmitting signaling or data).

The network-side device 10 provided in some embodiments of this disclosure may be a base station. The base station may be a commonly used base station or an evolved node base station (evolved node base station, eNB), or may be a network-side device in a 5G system (for example, a next generation node base station (next generation node base station, gNB), or a transmission and reception point (transmission and reception point, TRP) or a cell, or the like.

The user equipment provided in some embodiments of this disclosure may be a mobile phone, a tablet computer, a notebook computer, an ultra-mobile personal computer (Ultra-mobile Personal Computer, UMPC), a netbook, a personal digital assistant (Personal Digital Assistant, PDA), or the like.

Figure 2:
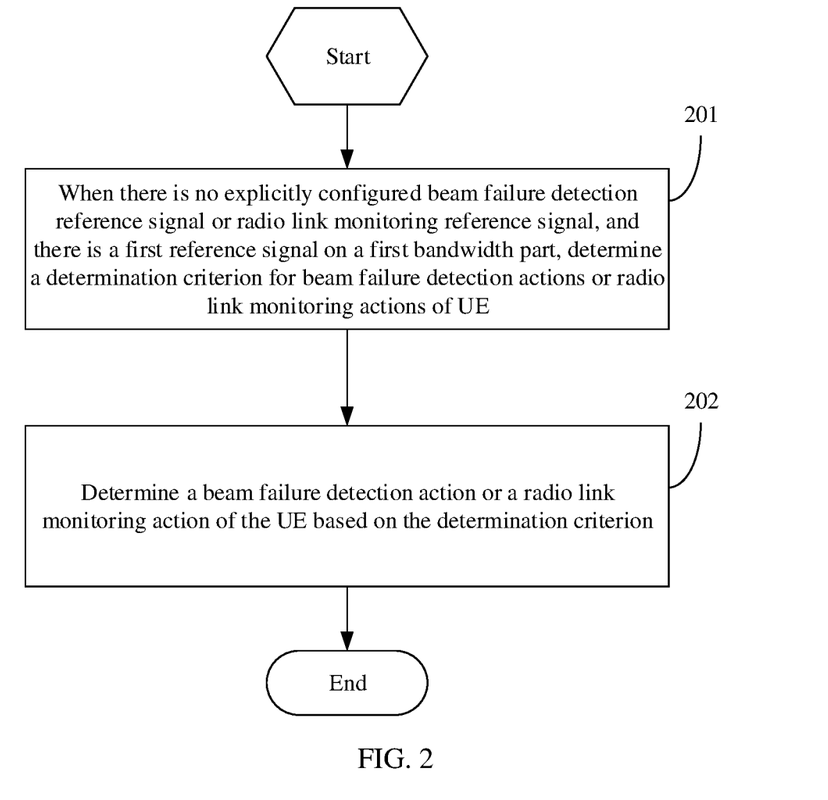
FIG. 2 is a first flowchart of a processing method according to some embodiments of this disclosure.

As shown in FIG. 2, it is a flowchart of a processing method provided according to some embodiments of this disclosure. The processing method is executed by UE, specifically including the following steps:

Step 201: When there is no explicitly configured beam failure detection reference signal or radio link monitoring reference signal, and there is a first reference signal on a first bandwidth part, determine a determination criterion for beam failure detection actions or radio link monitoring actions of the UE;

In some embodiments of this disclosure, the first reference signal is a reference signal whose QCL type is a specified type in a reference signal set, the reference signal set is indicated by a transmission configuration indication state of a physical downlink control channel on a control resource set on a second bandwidth part, and the second bandwidth part is in an active state.

In some embodiments of this disclosure, the above specified type is used for indicating a spatial receiving parameter.

Step 202: Determine a beam failure detection action or a radio link monitoring action of the UE based on the determination criterion.

In some embodiments of this disclosure, the above second bandwidth part may also be referred to as an active BWP, and the first bandwidth part may also be referred to as another BWP, or an inactive bandwidth part (inactive BWP).

In some embodiments of this disclosure, any one of the following is included in the above step 202:

a: if the first bandwidth part is different from the second bandwidth part, cease to detect whether a beam failure or a radio link failure has occurred on the physical downlink control channel on the control resource set on the second bandwidth part;

b: if there is a reference signal with an unspecified type in the reference signal set, and the reference signal with the unspecified type is on the second bandwidth part, use the reference signal with the unspecified type on the second bandwidth part as a beam failure detection reference signal or a radio link monitoring reference signal; and c: if the first bandwidth part and the second bandwidth part belong to different cells or carriers, detect whether a beam failure or a radio link failure has occurred on the physical downlink control channel on the control resource set on the second bandwidth part by monitoring the first reference signal on the first bandwidth part. That is, when the first bandwidth part and the second bandwidth part are different BWPs of a same cell or carrier, the UE is only able to monitor the PDCCH of the CORESET on the active BWP. But if they are on different cells or carriers, then the UE is able to receive information of the BWPs on different cells or carriers. For example, UE having a plurality of RF channels may receive information from different cells or carriers at the same time, or one of the RF channels of the UE supports a relatively large bandwidth, which enables receiving information on two cells or carriers without RF channel switching.

In some embodiments of this disclosure, the reference signal with the unspecified type may be a tracking reference signal (Tracking Reference Signal, TRS). That is, the UE uses the TRS as a beam failure detection reference signal or a radio link monitoring reference signal and determines whether a beam failure or a radio link failure has occurred on the physical downlink control channel on the control resource set on the second bandwidth part by measuring quality of the TRS.

In some embodiments of this disclosure, the specified type may be type D (type D), and the above unspecified type may be type A, type B, type C, or the like.

In some embodiments of this disclosure, optionally, the method further includes: when beam failure detection reference signals or radio link monitoring reference signals are explicitly configured, during beam failure detection or radio link monitoring, monitoring only a beam failure detection reference signal or a radio link monitoring reference signal in spatial QCL with the physical downlink control channel on the control resource set on the current active bandwidth part.

In some embodiments of this disclosure, in the case there is no BFD RS or RLM RS explicitly configured on an active BWP, when an RS whose QCL type is type D indicated by a TCI state of a PDCCH on a CORESET on the current active bandwidth part is on another BWP, the UE may determine whether a beam failure or a radio link failure has occurred on the active BWP by detecting the RS on the another BWP, or cease to detect whether a beam detection failure or a radio link failure has occurred on the PDCCH on the CORESET, or use another RS on the active BWP as a BFD RS or an RLM RS. In this way, some embodiments of this disclosure enable the UE to continue to increase the correctness rate of the beam failure detection or the radio link monitoring and recovery mechanism, thereby improving effectiveness of communication.

Figure 3:
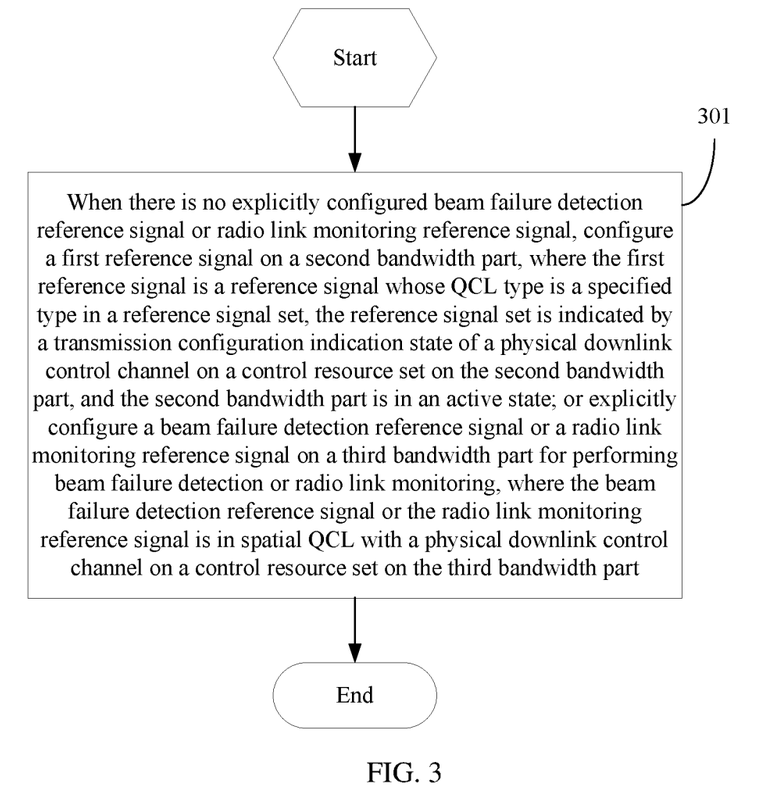
FIG. 3 is a second flowchart of the processing method according to some embodiments of this disclosure.

As shown in FIG. 3, it is a flowchart of a processing method provided according to some embodiments of this disclosure. The processing method is executed by a network-side device, specifically including the following steps:

Step 301: When there is no explicitly configured beam failure detection reference signal or radio link monitoring reference signal, configure a first reference signal on a second bandwidth part, where the first reference signal is a reference signal whose QCL type is a specified type in a reference signal set, the reference signal set is indicated by a transmission configuration indication state of a physical downlink control channel on a control resource set on the second bandwidth part, and the second bandwidth part is in an active state; or explicitly configure a beam failure detection reference signal or a radio link monitoring reference signal on a third bandwidth part for performing beam failure detection or radio link monitoring, where the beam failure detection reference signal or the radio link monitoring reference signal is in spatial QCL with a physical downlink control channel on a control resource set on the third bandwidth part.

In some embodiments of this disclosure, the above second bandwidth part or third bandwidth part may also be referred to as an active BWP.

In some embodiments of this disclosure, the specified type may be type D (type D), and the above unspecified type may be type A, type B, type C, or the like.

In some embodiments of this disclosure, the network-side device must configure, on the active BWP, the RS whose QCL type is type D indicated by the TCI state of the PDCCH on the CORESET on the active BWP. That is, the network-side device configures the PDCCH on the CORESET and the RS whose QCL type is type D indicated by the TCI state of the PDCCH on the same BWP. Or, the network-side device explicitly configures a BFD RS or an RLM RS, which is to always configure a beam failure detection reference signal or a radio link monitoring reference signal in spatial QCL with a PDCCH on a CORESET on each BWP.

In some embodiments of this disclosure, the network-side device configures the PDCCH on the CORESET and the RS whose QCL type is type D indicated by the TCI state of the PDCCH on the same BWP, or always configures a BFD RS or an RLM RS in spatial QCL with the PDCCH on the CORESET on each BWP. In this way, some embodiments of this disclosure enable the UE to continue to increase the correctness rate of the beam failure detection or the radio link monitoring and recovery mechanism, thereby improving effectiveness of communication.

Some embodiments of this disclosure further provide user equipment. Since the principles of the user equipment resolving the problem are similar to the processing method in some embodiments of this disclosure, for the implementation of the user equipment, reference may be made to the implementation of the method, and details are not repeated.

Figure 4:
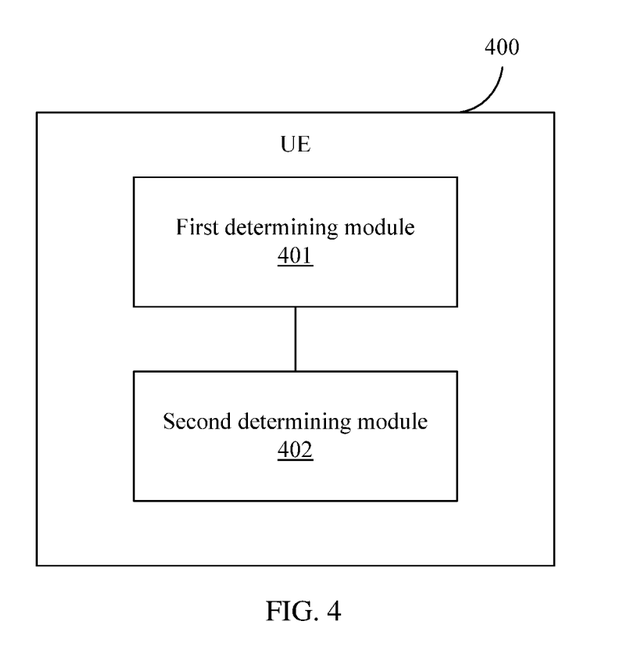
FIG. 4 is a first structural diagram of user equipment according to some embodiments of this disclosure.

As shown in FIG. 4, it is a schematic structural diagram of UE according to some embodiments of this disclosure. The UE 400 includes:

a first determining module 401, configured to, when there is no explicitly configured beam failure detection reference signal or radio link monitoring reference signal, and there is a first reference signal on a first bandwidth part, determine a determination criterion for beam failure detection actions or radio link monitoring actions of the UE; and a second determining module 402, configured to determine a beam failure detection action or a radio link monitoring action of the UE based on the determination criterion; where the first reference signal is a reference signal whose QCL type is a specified type in a reference signal set, the reference signal set is indicated by a transmission configuration indication state of a physical downlink control channel on a control resource set on a second bandwidth part, and the second bandwidth part is in an active state.

In some embodiments of this disclosure, the second determining module 402 is specifically configured to:

if the first bandwidth part is different from the second bandwidth part, cease to detect whether a beam failure or a radio link failure has occurred on the physical downlink control channel on the control resource set on the second bandwidth part; or if there is a reference signal with an unspecified type in the reference signal set, and the reference signal with the unspecified type is on the second bandwidth part, use the reference signal with the unspecified type on the second bandwidth part as a beam failure detection reference signal or a radio link monitoring reference signal; or if the first bandwidth part and the second bandwidth part belong to different cells or carriers, detect whether a beam failure or a radio link failure has occurred on the physical downlink control channel on the control resource set on the second bandwidth part by monitoring the first reference signal on the first bandwidth part.

In some embodiments of this disclosure, the reference signal with the unspecified type is a tracking reference signal.

In some embodiments of this disclosure, the above second bandwidth part may also be referred to as an active BWP.

In some embodiments of this disclosure, the specified type may be type D (type D), and the above unspecified type may be type A, type B, type C, or the like.

In some embodiments of this disclosure, the UE further includes:

a monitoring module, configured to, when beam failure detection reference signals or radio link monitoring reference signals are explicitly configured, during beam failure detection or radio link monitoring, monitor only a beam failure detection reference signal or a radio link monitoring reference signal in spatial QCL with the physical downlink control channel on the control resource set on the second bandwidth part.

The user equipment provided according to some embodiments of this disclosure may execute the above method embodiment, with a similar implementation principle and similar technical effects. Details are not repeated herein in this embodiment.

In some embodiments of this disclosure, a network-side device is further provided. Since the principles of the network-side device resolving the problem are similar to the processing method in some embodiments of this disclosure, for the implementation of the network-side device, reference may be made to the implementation of the method, and details are not repeated.

Figure 5:
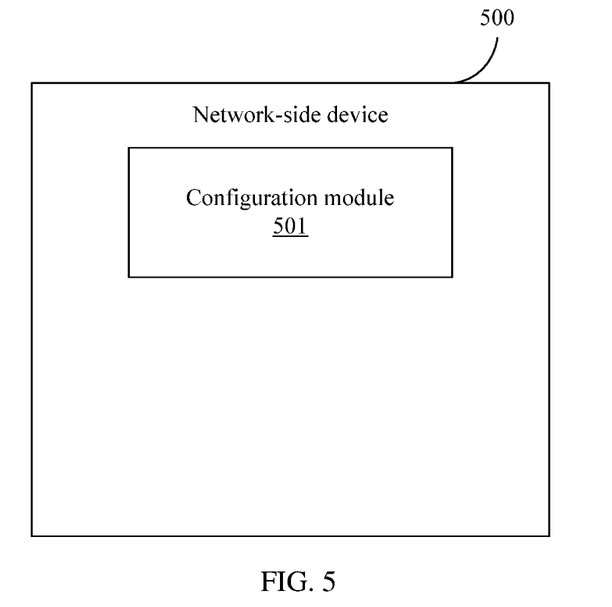
FIG. 5 is a first structural diagram of a network-side device according to some embodiments of this disclosure.

As shown in FIG. 5, it is a schematic structural diagram of a network-side device according to some embodiments of this disclosure. The network-side device 500 includes:

a configuration module 501, configured to, when there is no explicitly configured beam failure detection reference signal or radio link monitoring reference signal, configure a first reference signal on a second bandwidth part, where the first reference signal is a reference signal whose QCL type is a specified type in a reference signal set, the reference signal set is indicated by a transmission configuration indication state of a physical downlink control channel on a control resource set on the second bandwidth part, and the second bandwidth part is in an active state; or explicitly configure a beam failure detection reference signal or a radio link monitoring reference signal on a third bandwidth part for performing beam failure detection or radio link monitoring, where the beam failure detection reference signal or the radio link monitoring reference signal is in spatial QCL with a physical downlink control channel on a control resource set on the third bandwidth part.

In some embodiments of this disclosure, the specified type may be type D (type D), and the above unspecified type may be type A, type B, type C, or the like.

The network-side device provided according to some embodiments of this disclosure may execute the above method embodiment, with a similar implementation principle and similar technical effects. Details are not repeated herein in this embodiment.

Figure 6:
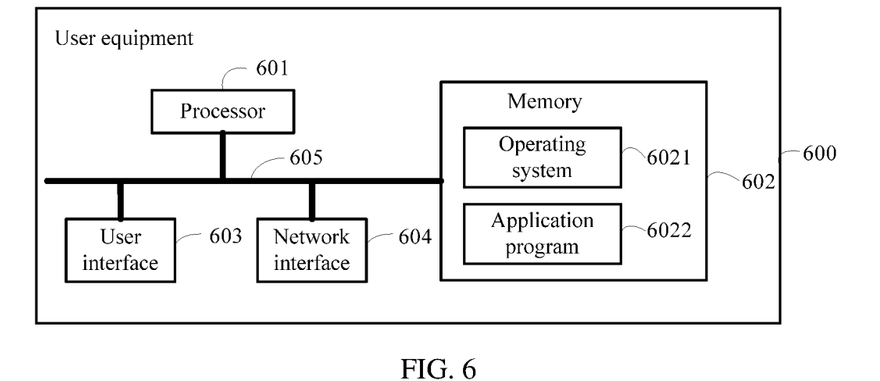
FIG. 6 is a second structural diagram of user equipment according to some embodiments of this disclosure.

As shown in FIG. 6, user equipment 600 shown in FIG. 6 includes at least one processor 601, a memory 602, at least one network interface 604, and a user interface 603. The components of the user equipment 600 are coupled together through a bus system 605. It may be understood that the bus system 605 is used to implement connection and communication between these components. In addition to a data bus, the bus system 605 further includes a power bus, a control bus, and a status signal bus. However, for clarity of description, various buses are marked as the bus system 605 in FIG. 6.

The user interface 603 may include a display, a keyboard, or a pointing device (for example, a mouse, a trackball (trackball), a touch panel, or a touchscreen).

It may be understood that the memory 602 in some embodiments of this disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not restrictive description, many forms of RAM may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 602 described in some embodiments of this disclosure is intended to include but not be limited to these and any other applicable types of memories.

In some embodiments, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player (Media Player) and a browser (Browser), which are used to implement various application services. A program for implementing the method in some embodiments of this disclosure may be included in the application program 6022.

In some embodiments of this disclosure, the following steps are implemented by calling and executing the program or instructions stored in the memory 602, which may specifically be the program or instructions stored in the application program 6022: when there is no explicitly configured beam failure detection reference signal or radio link monitoring reference signal, and there is a first reference signal on a first bandwidth part, determining a determination criterion for beam failure detection actions or radio link monitoring actions of the UE; and determining a beam failure detection action or a radio link monitoring action of the UE based on the determination criterion; where, the first reference signal is a reference signal whose QCL type is a specified type in a reference signal set, the reference signal set is indicated by a transmission configuration indication state of a physical downlink control channel on a control resource set on a second bandwidth part, and the second bandwidth part is in an active state.

The user equipment provided according to some embodiments of this disclosure may execute the above method embodiment, with a similar implementation principle and similar technical effects. Details are not repeated herein in this embodiment.

Figure 7:
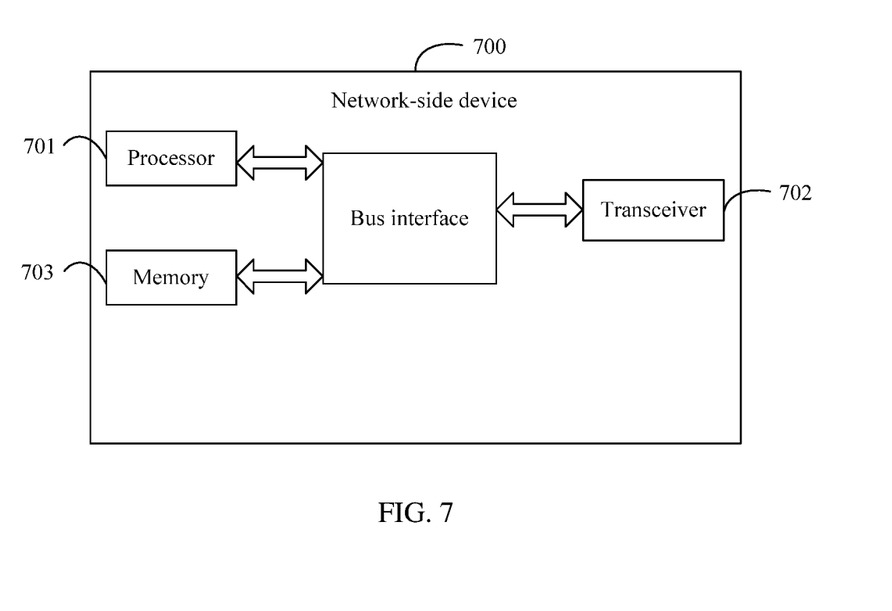
FIG. 7 is a second structural diagram of the network-side device according to some embodiments of this disclosure.

Referring to FIG. 7, some embodiments of this disclosure provide another network-side device 700 including a processor 701, a transceiver 702, a memory 703, a user interface 704, and a bus interface.

The processor 701 is responsible for management of the bus architecture and general processing. The memory 703 may store data for use by the processor 701 when performing an operation.

In some embodiments of this disclosure, the network-side device 700 may further include a computer program that is stored in the memory 703 and capable of running on the processor 701. When the computer program is executed by the processor 701, the following steps are implemented: when there is no explicitly configured beam failure detection reference signal or radio link monitoring reference signal, configuring a first reference signal on a second bandwidth part, where the first reference signal is a reference signal whose QCL type is a specified type in a reference signal set, the reference signal set is indicated by a transmission configuration indication state of a physical downlink control channel on a control resource set on the second bandwidth part, and the second bandwidth part is in an active state; or explicitly configuring a beam failure detection reference signal or a radio link monitoring reference signal on a third bandwidth part for performing beam failure detection or radio link monitoring, where the beam failure detection reference signal or the radio link monitoring reference signal is in spatial QCL with a physical downlink control channel on a control resource set on the third bandwidth part.

In FIG. 7, a bus architecture may include any quantity of interconnected buses and bridges, and specifically connect together various circuits of one or more processors represented by the processor 701 and a memory represented by the memory 703. The bus architecture may further connect various other circuits such peripheral device, voltage stabilizer, to various other circuits such as a power management circuits. These are well known in the art, and therefore are not further described in some embodiments of this disclosure. A bus interface provides interfaces. The transceiver 702 may be a plurality of elements, including a transmitter and a receiver, and provides units configured to perform communication with various other apparatuses over a transmission medium.

The network-side device provided according to some embodiments of this disclosure may execute the above method embodiment, with a similar implementation principle and similar technical effects. Details are not repeated herein in this embodiment.

The method or algorithmic steps described in combination with the content disclosed in this disclosure may be implemented by hardware, or may be implemented by a processor executing software instructions. The software instructions may consist of corresponding software modules. The software module may be stored in a RAM, a flash memory, a ROM, an EPROM, an EEPROM, a register, a hard disk, a removable hard disk, a CD-ROM, or a storage medium of any other form known in the art. For example, a storage medium is coupled to the processor, enabling the processor to read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that in the foregoing one or more examples, functions described in this disclosure may be implemented by hardware, software, firmware, or any combination thereof. In the case of implementation by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another place. The storage medium may be any available medium accessible by a general-purpose or dedicated computer.

The objectives, technical solutions, and benefits of this disclosure are further described in detail in the foregoing specific implementations. It should be understood that the foregoing descriptions are merely specific implementations of this disclosure, but are not intended to limit the protection scope of this disclosure. Any modification, equivalent replacement, or improvement made based on the technical solutions in this disclosure shall fall within the protection scope of this disclosure.

A person skilled in the art should understand that some embodiments of this disclosure may be provided as a method, a system, or a computer program product. Therefore, some embodiments of this disclosure may be hardware-only embodiments, software-only embodiments, or embodiments with a combination of software and hardware. Moreover, some embodiments of this disclosure may be implemented in the form of one or more computer program products implemented on a computer-usable storage medium (including but not limited to a disk memory, a CD-ROM, an optical memory, and the like) that includes computer-usable program code.

Some embodiments of this disclosure are described with reference to the flowcharts and/or block diagrams of the method, the device (system), and the computer program product according to some embodiments of this disclosure. It should be understood that each process and/or each block in the flowcharts and/or the block diagrams, or a combination of a process and/or a block in the flowcharts and/or the block diagrams may be implemented by computer program instructions. These computer program instructions may be provided to a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, persons skilled in the art can make various modifications and variations to some embodiments of this disclosure without departing from the spirit and scope of this disclosure. This disclosure is intended to cover these modifications and variations to some embodiments of this disclosure provided that they fall within the protection scope defined by the claims of this disclosure and their equivalent technologies.

What is claimed is:

1. A processing method, applied to user equipment (UE), wherein the method comprises:
when there is no explicitly configured beam failure detection reference signal or radio link monitoring reference signal, and there is a first reference signal on a first bandwidth part, determining a determination criterion for beam failure detection actions or radio link monitoring actions of the UE; and
determining a beam failure detection action or a radio link monitoring action of the UE based on the determination criterion; wherein
the first reference signal is a reference signal whose quasi-co-location (QCL) type is a specified type in a reference signal set, the reference signal set is indicated by a transmission configuration indication state of a physical downlink control channel on a control resource set on a second bandwidth part, and the second bandwidth part is in an active state;
wherein the determining a beam failure detection action or a radio link monitoring action of the UE based on the determination criterion comprises any one of the following:
if the first bandwidth part is different from the second bandwidth part, ceasing to detect whether a beam failure or a radio link failure has occurred on the physical downlink control channel on the control resource set on the second bandwidth part;
if there is a reference signal whose QCL type is an unspecified type in the reference signal set, and the reference signal with the unspecified type is on the second bandwidth part, using the reference signal with the unspecified type on the second bandwidth part as a beam failure detection reference signal or a radio link monitoring reference signal; and
if the first bandwidth part and the second bandwidth part belong to different cells or carriers, detecting whether a beam failure or a radio link failure has occurred on the physical downlink control channel on the control resource set on the second bandwidth part by monitoring the first reference signal on the first bandwidth part.

2. The method according to claim 1, wherein the reference signal with the unspecified type is a tracking reference signal (TRS).

3. The method according to claim 1, wherein the specified type is type D.

4. The method according to claim 1, further comprising:
when beam failure detection reference signals or radio link monitoring reference signals are explicitly configured, during beam failure detection or radio link monitoring, monitoring only a beam failure detection reference signal or a radio link monitoring reference signal in spatial QCL with the physical downlink control channel on the control resource set on the second bandwidth part.

5. User equipment, comprising: a processor, a memory, and a computer program that is stored in the memory and capable of running on the processor, wherein when the computer program is executed by the processor, the processor implements:
when there is no explicitly configured beam failure detection reference signal or radio link monitoring reference signal, and there is a first reference signal on a first bandwidth part, determining a determination criterion for beam failure detection actions or radio link monitoring actions of the UE; and
determining a beam failure detection action or a radio link monitoring action of the UE based on the determination criterion; wherein
the first reference signal is a reference signal whose quasi-co-location (QCL) type is a specified type in a reference signal set, the reference signal set is indicated by a transmission configuration indication state of a physical downlink control channel on a control resource set on a second bandwidth part, and the second bandwidth part is in an active state;
wherein the determining a beam failure detection action or a radio link monitoring action of the UE based on the determination criterion comprises any one of the following:
if the first bandwidth part is different from the second bandwidth part, ceasing to detect whether a beam failure or a radio link failure has occurred on the physical downlink control channel on the control resource set on the second bandwidth part;
if there is a reference signal whose QCL type is an unspecified type in the reference signal set, and the reference signal with the unspecified type is on the second bandwidth part, using the reference signal with the unspecified type on the second bandwidth part as a beam failure detection reference signal or a radio link monitoring reference signal; and
if the first bandwidth part and the second bandwidth part belong to different cells or carriers, detecting whether a beam failure or a radio link failure has occurred on the physical downlink control channel on the control resource set on the second bandwidth part by monitoring the first reference signal on the first bandwidth part.

6. The user equipment according to claim 5, wherein the reference signal with the unspecified type is a tracking reference signal (TRS).

7. The user equipment according to claim 5, wherein the specified type is type D.

8. The user equipment according to claim 5, wherein when the computer program is executed by the processor, the processor further implements:
when beam failure detection reference signals or radio link monitoring reference signals are explicitly configured, during beam failure detection or radio link monitoring, monitoring only a beam failure detection reference signal or a radio link monitoring reference signal in spatial QCL with the physical downlink control channel on the control resource set on the second bandwidth part.

9. A non-transitory computer-readable storage medium, wherein the computer-readable storage medium stores a computer program, and when the computer program is executed by a processor, the steps of the processing method according to claim 1 are implemented.

10. The non-transitory computer-readable storage medium according to claim 9, wherein the reference signal with the unspecified type is a tracking reference signal (TRS).

11. The non-transitory computer-readable storage medium according to claim 9, wherein the specified type is type D.

12. The non-transitory computer-readable storage medium according to claim 9, when the computer program is executed by a processor, the processor further implements:
- when beam failure detection reference signals or radio link monitoring reference signals are explicitly configured, during beam failure detection or radio link monitoring, monitoring only a beam failure detection reference signal or a radio link monitoring reference signal in spatial QCL with the physical downlink control channel on the control resource set on the second bandwidth part.

* * * * *